C. L. B. DE SAUNIER.
VEHICLE COUPLING ATTACHMENT.
APPLICATION FILED MAR. 23, 1920.

1,338,561. Patented Apr. 27, 1920.

INVENTOR
CHARLES LOUIS BAUDRY de SAUNIER
BY Howson and Howson
ATTORNEYS

UNITED STATES PATENT OFFICE.

CHARLES LOUIS BAUDRY DE SAUNIER, OF PARIS, FRANCE.

VEHICLE-COUPLING ATTACHMENT.

1,338,561.   Specification of Letters Patent.   Patented Apr. 27, 1920.

Application filed March 23, 1920. Serial No. 368,153.

*To all whom it may concern:*

Be it known that I, CHARLES LOUIS BAUDRY DE SAUNIER, a citizen of the Republic of France, and a resident of 108 Rue Lauriston, Paris, France, have invented new and useful Improvements in Vehicle-Coupling Attachments, of which the following is a specification.

In the vehicle coupling-attachments now in use, one of the coupling elements usually consists in a kind of hook, connected to the tractor vehicle by a suitable device, which may or not produce a cushioning effect, and the other coupling elements consists in a ring carried by the draw-bar of the trailer vehicle, with which engages the hook of the tractor vehicle. The vehicle coupling-attachments of this kind present the drawback that they do not permit a coupling without play, for the diameter of the ring does not correspond exactly to the space between the arms of the hook; shocks are produced between the two elements of the coupling, by starting, stopping and by changes of level due to the road. It is very advantageous to use a device capable of suppressing these shocks and simultaneously allowing the coupling and uncoupling to be done very rapidly, by means of very simple devices which do not require tools nor any detached member, which is easily lost.

The present invention concerns a vehicle coupling-attachment fulfilling these conditions; it is characterized by the fact that one of the coupling elements consists in a ring or socket, suitably mounted on one of the vehicles, and the other coupling element consists in a draw-bar portion, adapted to make a sliding fit into said ring or socket and provided, near its end, with a shoulder forming a stop, and, at its end, with a cotter or sliding key; this cotter is provided with a slot forming a slide inseparably engaging a pin upon which it can move, to assume a position parallel or perpendicular to the axis of the draw-bar, within slots formed in the extremity of said draw-bar, in such a manner that, in the first position, the end of the draw-bar can be passed into the socket or ring while in the other position, all disconnection of coupling elements is impossible.

The annexed drawing shows, by way of example, one form of construction of the coupling device according to the present invention in the case in which the ring or socket carried by the tractor vehicle is mounted with a double link.

Figure 2:
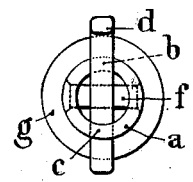
Fig. 2 is a corresponding end view.
Figure 1:
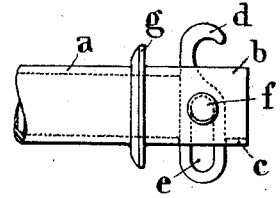
Figure 1 is a view in elevation of the coupling element for the trailer.
Figure 4:
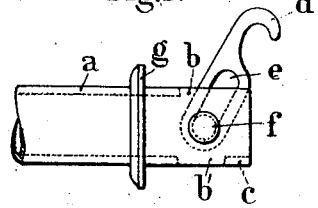
Figs. 3, 4 and 5 are similar views to Fig. 1, the tilting cotter being in different positions.
Figure 3:
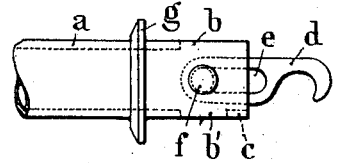
Figure 6:
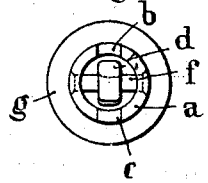
Fig. 6 is an end view corresponding with Fig. 5.
Figure 5:
Figure 7:
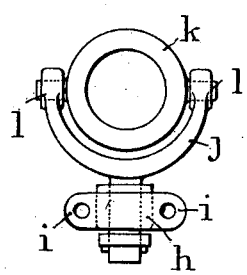
Fig. 7 is an elevation of the cardan-fitted ring intended to be fixed to rear of the tractor-vehicle.
Figure 8:
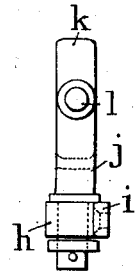
Fig. 8 is the corresponding side view.

In principle, the draw-bar of the vehicle to be hauled (Figs. 1 to 6) ends in a cylindrical tube $a$ slotted at $b$ in a direction parallel to its axis and for a sufficient distance. Another slot $b'$ diametrically opposite is also formed in the tube, this slot, however, not extending to the extremity of the tube $a$ so that the part $c$ closing the end of the slot affords a reinforcement to the tube. These slots $b$, $b'$ form a guide for a cotter $d$ the body portion of which is cut out to form a slide $e$ which enables it to move upon a horizontal pin $f$ fixed in the tube $a$ upon a diameter at right angles to the plane of the cotter $d$. The last-named can assume the vertical position indicated in Fig. 1 or any intermediate position between that of Fig. 1 and that of Fig. 3, that is to say horizontal, so as to form a prolongation of the draw-bar, of the hauled vehicle and even take up a position in the interior of the tube, as shown in Fig. 5.

The tube is also furnished with a shoulder or collar $g$ serving as a stop for the coupling element belonging to the tractor vehicle.

The coupling member from the tractor or towing vehicle is composed of a vertical socket $h$ fixed to the chassis or frame of the tractor vehicle by means of lugs $i$, in which socket is thus turnably arranged a fork $j$. This fork embraces a ring $k$ which can turn therein by means of horizontal trunnions $l$. The ring can therefore assume, relatively to the vehicle, all necessary positions, since its horizontal trunnion axis and the vertical axis of the fork $j$ are in the same plane and thus form a universal ball-joint. The interior diameter of the ring $k$ is such that the tube of the draw-bar can pass easily therethrough without undue friction.

Figure 9:
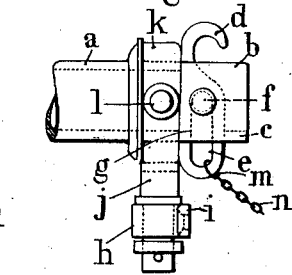
Fig. 9 is an elevation of the two elements assembled to form the coupling.
Figure 10:
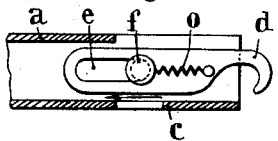
Fig. 10 is a detail view in sectional elevation.

The coupling of the vehicles is effected in the following manner; the cotter $d$ being in the horizontal position (Fig. 5), the tube $a$ is passed through the ring $k$ until the shoulder $g$ abuts against the ring $k$, as shown in Fig. 9. The cotter is then drawn out from the tube $a$, set up in the vertical position and pressed vertically down to the end of the slide $e$ (Fig. 9).

The coupling of the vehicles is thus insured without danger of disconnection otherwise than by a reversal of the procedure. For further security, a link or shackle $m$ may be passed through the slide $e$, said link being connected by a chain $n$ to one of the two vehicles. In order to avoid any play, the shoulder $g$ should be arranged upon the tube in such a way that the cotter $d$ presses lightly upon the ring $k$. If desired, I may impart to one of the faces of the cotter $d$ a very slight taper to provide a wedging action.

So as to avoid the use of a chain to keep the cotter $d$ in place, this may be held in place in either the closing position (Fig. 1) or the non-working position (Fig. 5) by a coil spring $o$ of which one end is fixed to the cotter $d$ and the other to the pin $f$.

It is obvious that the present invention is not limited to the details above described by way of example; thus, for instance, this coupling-attachment may be used with any device allowing of the relative displacements of both coupling elements one to the other, as for instance, the cushioning device described in my U. S. patent application Serial No. 346,605, filed December 22, 1919.

Having now particularly described and ascertained the nature of my said invention and in what manner the same is to be performed, I declare that what I claim is:—

1. A coupling arrangement for two vehicles, comprising a tractor vehicle and a trailer vehicle, said arrangement comprising an annular member, mounted on one of the said vehicles, and within which engages the extremity of the draw-bar carried by the other vehicle, a shoulder and a tilting cotter provided on said extremity of the draw-bar and holding the said annular member, said draw bar having radial slots for the reception of the cotter when tilted.

2. A coupling arrangement for two vehicles, comprising a tractor vehicle and a trailer vehicle, said arrangement comprising a ring mounted between the arms of a fork trunnioned in a socket fixed to one of the vehicles, the extremity of the draw-bar carried by the other vehicle, engaging within said ring, a shoulder and a tilting cotter provided on said extremity of the draw-bar and holding the said ring in place, and radial slots provided in said extremity of the draw-bar and within which the tilting cotter can move.

3. A coupling arrangement for two vehicles, comprising a tractor vehicle and a trailer vehicle, said arrangement comprising a ring mounted between the arms of a fork trunnioned in a socket fixed to one of the vehicles, the extremity of the draw-bar carried by the other vehicle, engaging within said ring, a shoulder and a tilting cotter provided on said extremity of the draw-bar and holding the said ring in place, said cotter being furnished with a slot forming a slide inseparably engaging a pin upon which it can move, to assume a position parallel or perpendicular to the axis of the said draw-bar, within radial slots formed in the extremity of the draw-bar.

In testimony whereof I have signed my name to this specification.

CHARLES LOUIS BAUDRY DE SAUNIER.

Witnesses:
JACQUES ARMENGAUD,
PIERRE ARMENGAUD.